(12) United States Patent
Hoerner et al.

(10) Patent No.: US 12,365,131 B2
(45) Date of Patent: Jul. 22, 2025

(54) DEVICE AND METHOD FOR BONDING AT LEAST ONE MATERIAL SEGMENT TO A STEERING DEVICE

(71) Applicant: Joyson Safety Systems Germany GmbH, Aschaffenburg (DE)

(72) Inventors: Stefan Hoerner, Aschaffenburg (DE); Daniel Haines, Waldaschaff (DE); Senad Gredic, Obernrsel (DE)

(73) Assignee: Joyson Safety Systems Germany GmbH, Aschaffenburg (DE)

(*) Notice: Subject to any disclaimer, the term of this patent is extended or adjusted under 35 U.S.C. 154(b) by 0 days.

(21) Appl. No.: 17/769,294

(22) PCT Filed: Oct. 15, 2020

(86) PCT No.: PCT/EP2020/079083
§ 371 (c)(1),
(2) Date: Apr. 14, 2022

(87) PCT Pub. No.: WO2021/074317
PCT Pub. Date: Apr. 22, 2021

(65) Prior Publication Data
US 2024/0140019 A1    May 2, 2024

(30) Foreign Application Priority Data
Oct. 16, 2019 (DE) .................. 10 2019 215 945.1

(51) Int. Cl.
*B29C 63/00* (2006.01)
*B29L 31/30* (2006.01)

(52) U.S. Cl.
CPC ... *B29C 63/0073* (2013.01); *B29L 2031/3047* (2013.01); *Y10T 29/49488* (2015.01)

(58) Field of Classification Search
CPC ......... B29C 63/0073; B29L 2031/3047; Y10T 29/49488; B62D 1/06
See application file for complete search history.

(56) References Cited

U.S. PATENT DOCUMENTS

| | | |
|---|---|---|
| 2005/0224163 A1 | 10/2005 | Cho |
| 2011/0232414 A1 | 9/2011 | Müller et al. |
| 2020/0156327 A1 | 5/2020 | Tensho |

FOREIGN PATENT DOCUMENTS

| | | |
|---|---|---|
| CN | 1655950 A | 8/2005 |
| CN | 101808877 A | 8/2010 |

(Continued)

OTHER PUBLICATIONS

Machine translation of JP 2011-126395 A (Year: 2011).*

(Continued)

*Primary Examiner* — Vishal I Patel
(74) *Attorney, Agent, or Firm* — Fitch, Even, Tabin & Flannery LLP (57) ABSTRACT

It is provided a device for bonding at least one material segment to a steering device. The device comprises at least two form fitting segments, wherein at least one of the form fitting segments is movably mounted relative to the at least one other form fitting segment, wherein the form fitting segments are configured in such a way that they can at least sectionally enclose the steering device, in particular the steering wheel rim of the steering device; a receptacle for receiving the steering device; a drive mechanism for moving the at least one movably mounted form fitting segment towards the steering device.

11 Claims, 4 Drawing Sheets

(56) References Cited

FOREIGN PATENT DOCUMENTS

| CN | 106817896 | A |   | 6/2017  |             |
|----|-----------|---|---|---------|-------------|
| CN | 208576184 | U |   | 3/2019  |             |
| DE | 102007028201 | A1 |   | 12/2008 |          |
| DE | 102007031014 | A1 | * | 1/2009  | ............ B62D 1/06 |
| EP | 1531036   | A1 | * | 5/2005  | ............ B29C 63/04 |
| EP | 1964751   | A2 |   | 9/2008  |             |
| FR | 2424841   | A1 |   | 11/1979 |             |
| JP | H03281477 | A |   | 12/1991 |             |
| JP | H05301570 | A |   | 11/1993 |             |
| JP | 2008143299 | A |   | 6/2008  |             |
| JP | 2011126395 | A | * | 6/2011  |             |

OTHER PUBLICATIONS

CNIPA; Office Action issued in 202080071692.2; issued Aug. 5, 2024.
CNIPA; Office Action issued in 202080071692.2; issued Jan. 29, 2024.
International Preliminary Report on Patentability; Application No. PCT/EP2020/079083; dated Apr. 19, 2022.

* cited by examiner

DEVICE AND METHOD FOR BONDING AT LEAST ONE MATERIAL SEGMENT TO A STEERING DEVICE

CROSS-REFERENCE TO A RELATED APPLICATION

This application is a National Phase Patent Application of International Patent Application Number PCT/EP2020/079083, filed on Oct. 15, 2020, which claims priority of German Patent Application Number 10 2019 215 945.1, filed on Oct. 16, 2019.

BACKGROUND

This disclosure relates to a device for bonding at least one material segment to a steering device and to a method for bonding at least one material segment to a steering device.

The sheathing of steering wheel rims with material segments (e.g. with leather coverings) is known from the prior art. DE 10 2017 031 014 A1 describes a method for sheathing a steering wheel segment with a leather blank.

SUMMARY

The object underlying the proposed solution consists in providing a device and a method for more efficiently connecting a material segment to a steering device.

This object is achieved by a device with features as described herein and by a method with features as described herein.

There is proposed a device for bonding at least one material segment to a steering device (bonding device), comprising
  at least two form fitting segments, wherein at least one of the form fitting segments is movably mounted relative to the at least one other form fitting segment, wherein the form fitting segments are configured in such a way that they can at least sectionally enclose the steering device, in particular the steering wheel rim of the steering device;
  a receptacle for receiving the steering device;
  a drive mechanism for moving the at least one movably mounted form fitting segment onto the steering device (and/or onto the receptacle and/or a free space for receiving a steering device).

With such a device, the expenditure of time for adhesively bonding can be distinctly reduced as compared to the commonly used techniques. The device can offer for example the advantage of uniform bonding (with uniform leather tension and reduced creasing).

The device can be of the partly or fully automated type. Such a device can offer the advantage that the at least one material segment can be bent around the steering device and bonded in an automated way. Partial or full automation can provide for a consistent bonding process in which the error influences and possibilities are reduced as compared to a manual bonding process.

Material segment in particular is understood to be a flat material, e.g. a material strip, which can be formed in one piece or in several pieces. Formed in one piece or in several pieces for example means that the material strip is joined either from at least two individual parts, i.e. the at least two individual parts in particular are sewn or bonded to each other, and/or that the material strip is of multilayer construction. Of multilayer construction in particular means constructed of several layers of one material or of layers of several materials. Multilayer materials for example can be composite materials, functional materials or functional elements. This can be for example functional mats such as heating mats, sensor mats (e.g. Hands-on-Detection (HOD) sensor mats) or soft mats. The material segment for example can be leather, artificial leather or a plastic (material).

Steering device in particular means a steering wheel blank or a steering wheel blank that is foam-coated or sheathed with a plastic material (foamed piece or foam blank). Steering device for example is understood to be a steering device not yet covered with leather. A steering device (steering handle) can be any device that specifies a steering angle, e.g. a steering wheel, a semi-circular steering wheel or a joystick. A usual steering device comprises a steering wheel rim, a steering wheel hub that can be coupled to the steering column, and at least one spoke, in particular two or three spokes that connect the steering wheel rim to the steering wheel hub. The steering wheel rim in particular includes curved surfaces so that it can be comfortably embraced by the hand of the vehicle occupant.

The at least two form fitting segments can be joinable to form one form fitting die for the steering device. The device can include for example several (e.g. three or four) lateral form fitting segments, which laterally move towards the steering device or away from the same. The device can include for example one or more upper form fitting segments that move towards the top of the steering device (from the side facing away from the floor) or move away from the same. The device can include for example one or more lower form fitting segments that move towards the bottom of the steering device (from the side facing the floor) or move away from the same. The device includes for example four lateral form fitting segments, one upper form fitting segment and one lower form fitting segment.

At least one of the form fitting segments is movably mounted relative to the at least one other form fitting segment. It is also possible that all form fitting segments are movably mounted relative to each other (towards each other).

The form fitting segments can be configured in such a way that they can at least sectionally positively and/or friction-locked enclose the steering device, in particular the steering wheel rim of the steering device.

The form fitting segments can be at least partly curved. For example, the form fitting segments on the side facing the steering device (or on the side facing the free space and/or the receptacle for receiving a steering device) have a curvature that provides for at least partly enclosing the steering device (the curved steering wheel rim of the steering device).

The at least two form fitting segments can be formed in such a way that the at least two form fitting segments together can enclose at least 50%, at least 65%, at least 75%, at least 90%, at least 95% or at least 99% of the circumference of the radial cross-section of the steering wheel rim.

Radial cross-section is understood to be a cross-section through the steering wheel rim parallel or approximately parallel to the steering axle or steering column. Approximately parallel means with a maximum deviation of up to 45° to the steering axle or steering column.

A circumferential cross-section is understood to be a cross-section through the steering wheel rim perpendicular or approximately perpendicular to the steering axle or steering column or a horizontal cross-section that extends circumferentially around the steering wheel hub. Approximately perpendicular means with a maximum deviation of up to 45° to the vertical of the steering axle or steering column.

The radial cross-section extends perpendicularly to the circumferential cross-section. The radial cross-section is smaller than the circumferential cross-section of the steering wheel rim.

The form fitting segments can be exchangeable. Thus, the form fitting segments can be adapted to different materials (e.g. leather or plastic), to different functional elements or functional materials, or to different steering devices (e.g. steering wheel types or joysticks). This can offer the advantage that the machine is more variably usable and can be adapted to customer-specific requirements. The respective form fitting segments can have been manufactured for example by optical measurement of the steering device and component manufacturing techniques known to the skilled person or by additive manufacture, 3D printing, laser sintering, casting, milling, etc. . . . .

The form fitting segments are formed from a material suitable for the device or at least contain the same. The form fitting segments can be formed e.g. from metal (e.g. aluminum, titanium), an alloy or a steel (e.g. stainless steel) or a suitable plastic (silicone, heat- and/or pressure-stable plastic, plastic foam) or a suitable ceramic (heat- or pressure-stable ceramic) or at least contain the same. Alternatively, the form fitting segments can also be formed from one of the aforementioned materials, which on its surface has a layer of a softer material (having a lower Shore hardness) than the aforementioned material. The form fitting segments can be formed e.g. from a silicone-coated steel or silicone-coated aluminum or a material with a coating of (3D-) printed material (having a lower Shore hardness).

The device can include a pressure generating unit for applying a pressure (e.g. 0.001 mbar to 10 bar) to at least one of the form fitting segments. The pressure generating unit for applying a pressure can be an overpressure generating unit for applying an overpressure (e.g. 1.1 bar to 10 bar) so that the form fitting segments are pressed against the steering device with a pressure between 1.1 bar to 10 bar. Alternatively, the pressure generating unit for applying a pressure can be a negative pressure generating unit for applying a negative pressure (e.g. 1.1 mbar to 10 bar) so that the form fitting segments exert a negative pressure on the steering device so that the form fitting segments are sucked against the steering device.

The device can include at least one heatable form fitting segment and at least one heating unit that communicates with the at least one heatable form fitting segment. The form fitting segments can be heated for example with a temperature in a range of 21 to 200° C., in particular 75° C. to 125° or 50° C. to 95° C. Alternatively, the device can also include non-heated form fitting segments.

The device can include at least one temperature sensor. The at least one temperature sensor can be arranged for example on the at least one heatable form fitting segment.

The device can include at least one coolable form fitting segment and at least one cooling unit that communicates with the at least one coolable form fitting segment. The form fitting segments can be cooled for example with a temperature in a range of −30° C. to 21° C. The cooling unit can be e.g. a water cooling unit.

The device includes an interior space. The device can include a housing that surrounds the interior space or can be arranged outside the interior space. The device can include a housing that surrounds an interior space with the at least two form fitting segments and/or the receptacle and/or the at least one drive mechanism. The form fitting segments can also be at least partly arranged outside the housing and be traversable into the housing.

The device includes a receptacle for receiving a steering device, in particular a steering wheel. The receptacle is arranged in particular in the interior space of the housing. The receptacle in particular includes a free space for receiving a steering device. The receptacle can be formed for example by a housing.

The free space and/or the receptacle for receiving a steering device is configured to correspond in its shape to the shape of the steering device, in particular of circular or oval shape.

The receptacle can include a holding device for receiving a steering device. The steering device can be releasably mounted e.g. on the holding device.

The device can include at least one fixing element for fixing the at least one material segment to the steering device. For example, the device can include two, three, four or more than four fixing elements. The at least one fixing element can be configured to fix the steering device at certain points, and the fixing elements can be equipped e.g. with a tip or blunt tip. The at least one fixing element can also be configured to fix the steering device at several points at the same time, for example the fixing element is configured to fit exactly with the steering device.

In one embodiment, the at least two form fitting segments and the at least one fixing element can be joinable to form a form fitting die for the steering device. For this purpose, the form fitting segments can include cutouts for the fixing elements. The device can include for example four lateral form fitting segments, an upper form fitting segment and a lower form fitting segment as well as two, three or four fixing elements that can be joined to form a form fitting die for the steering device.

The drive mechanism for joining the at least two form fitting segments can include at least one pushing and pulling unit and/or at least one lifting and lowering unit that is connected to at least one form fitting segment. The at least one lifting unit can communicate with the at least one upper form fitting segment. The at least one lowering unit can communicate with the at least one lower form fitting segment. The at least one pushing and pulling unit can communicate with the at least one lateral form fitting segment.

The device includes at least one drive mechanism. The drive mechanism can comprise at least one motorized, hydraulic and/or pneumatic drive. The drive mechanism can, however, also comprise at least one hand or foot drive. The drive mechanism can move the form fitting segments and/or the fixing elements towards the steering device or away from the steering device. For example, the at least one fixing element can first be moved towards the steering device and subsequently the at least one form fitting segment can be moved towards the steering device. It is also possible that several fixing elements are moved towards the steering device at the same time or one after the other. Subsequently, several form fitting segments can be moved towards the steering device at the same time or one after the other. After the bonding process, the at least one fixing element and/or the at least one form fitting segment can be moved away from the steering device at the same time or one after the other. The drive mechanism can include e.g. at least one pneumatic or hydraulic cylinder that is operatively connected to at least one form fitting segment. Moreover, each of the form fitting segments can each include a pneumatic or hydraulic cylinder.

The device can also include at least one control unit for actuating the at least one drive mechanism, the at least one pressure generating unit, heating unit or cooling unit.

There is also described a method for bonding at least one material segment to a steering device, in particular via a device according to the solution, comprising the following method steps:

i) contacting at least one portion of the steering device with at least one material segment, wherein either the at least one material segment on the side facing the steering device and/or the steering device (in particular the steering wheel rim of the steering device) on the side facing the material segment includes at least one bonding agent (or is in contact with a bonding agent), or a bonding agent is applied onto the side of the at least one material segment facing the steering device (in particular the steering wheel rim of the steering device) and/or onto the side of the steering device facing the material segment; and subsequently ii) joining at least two form fitting segments via a drive mechanism in such a way that the form fitting segments at least sectionally enclose the steering device (in particular the steering wheel rim of the steering device) and that the at least one material segment arranged between the steering device (in particular the steering wheel rim of the steering device) and the form fitting segments is urged against the steering device.

By such a method the expenditure of time for adhesively bonding can be distinctly reduced as compared to the commonly used manual techniques. The method can offer for example the advantage of uniform bonding (with uniform leather tension and reduced creasing).

The device used in the method can be of the partly or fully automated type. For example, this can offer the advantage that the at least one material segment can be bent around the steering device and bonded in an automated way, which allows to save time. Partial or full automation provides for a consistent bonding process in which the error influences and possibilities are reduced as compared to a manual bonding process.

The material segment has an inner side that faces the steering device and an outer side that faces away from the steering device. The steering device has an outer side that faces the inner side of the material segment. The bonding agent hence is applied onto the inner side of the material segment, onto the outer side of the steering device, in particular of the steering wheel rim, and/or into the space between the inner side of the material segment and the outer side of the steering device, in particular of the steering wheel rim.

The at least one material segment in particular can comprise leather or artificial leather or consist of the same. Alternatively, the at least one material segment can comprise a functional element, in particular a heating mat, a sensor mat (e.g. HOD sensor mat) or a soft mat, or can be such an element. The at least one material segment can consist e.g. of individual segments sewn together.

A bonding agent in particular is understood to be a gluing agent (e.g. an adhesive, in particular a thermally activatable adhesive, a dispersion or powder adhesive or spray adhesive), an adhesion promoter (e.g. an adhesive strip or adhesive net) or an adhesion agent The method can include for example a step of wet lamination (gluing by wet adhesive), dry lamination (gluing by dry adhesive) or thermal lamination (connecting by heat and/or pressure).

Contacting at least one portion of the steering device with at least one material segment, wherein the at least one material segment on the side facing the steering device and/or the steering device on the side facing the material segment includes at least one bonding agent means that the material segment already has a surface with a bonding agent, before it is brought in contact with the steering device. A material segment with a bonding agent upper side (e.g. an adhesive film) can be commercially purchased. A material segment that already includes a bonding agent before it is brought in contact with the steering device can also be obtained by a method step x) of applying a bonding agent onto one side of the material segment, which precedes method step i).

In step i), applying a bonding agent onto the side of the at least one material segment facing the steering device and/or onto the side of the steering device facing the material segment means that the material segment (still without bonding agent) is arranged around the steering device and the bonding agent is applied (e.g. sprayed, applied using a brush or inserted as an adhesive strip) either onto the inner side of the material segment and/or onto the outer side of the steering device and/or between the steering device and the material segment.

The bonding agent can be (have been) applied onto the respective material segment with a gluing quantity of 5 g/m$^2$ to 150 g/m$^2$, in particular 30 g/m$^2$ to 100 g/m$^2$.

Between the method steps i) and ii) the at least one material segment can be aligned with the steering device and/or be fixed via at least one fixing element. For example, the material segment can be fixed in the grooves (depressions) of the steering device. This can have the advantage, for example, to prevent or reduce slipping of the material segment and to counteract the formation of a material bead in the groove area. The at least one material segment can also be fixed at the seams of the material segment (if present). This can have the advantage, for example, that possible marks which a fixing element might leave would not be visible.

The application of the bonding agent onto the side of the at least one material segment facing the steering device and/or onto the side of the steering device facing the material segment in step i) or x) can be effected by a machine. The application of the bonding agent can be effected by a machine in the same device or in a separate device.

Between the method steps i) and ii) or after the method step ii) sewing of the at least one material segment to itself can be effected. The material segment in particular is sewn to itself in such a way that the at least one material segment encloses the circumference of the radial cross-section of the steering wheel rim, i.e. the material segment is sewn around the steering wheel.

For example, after method step i) the material segment is arranged on the steering device, subsequently the material segment is sewn to itself in such a way that it at least approximately completely encloses the steering device as seen in the radial cross-section, and then method step ii) is carried out. The fact that sewing is effected already before joining the form fitting segments (before step ii)) for example can have the advantage that the material segment can be positioned and/or fixed more easily, in particular when there is used a gluing agent that does not stick immediately, but still provides for shifting the material segment before the adhesive has firmly (cohesively) bonded to the steering device.

Before joining the form fitting segments, the steering device is moved for example into the free space provided for the steering device in the interior space of the device and releasably connected to a holding device.

The form fitting segments in step ii) then subsequently urge against the steering device so that the bonding agent present between form fitting segment and steering device cohesively bonds to the steering device, in particular to the steering wheel rim of the steering device. The form fitting segments can positively and/or friction-locked enclose the steering device, so that a particularly uniform cohesive connection of material segment, bonding agent and steering device is effected. The material segment, e.g. the leather, is bent over corresponding to the curvature of the steering wheel.

The form fitting segments can be moved towards the steering device or be pressed against the steering device (in particular the steering wheel rim of the steering device) at the same time or one after the other. For example, first the lateral form fitting segments and then the upper and/or lower form fitting segment can be moved towards the steering wheel device.

The form fitting segments can at least partly or completely enclose the steering device, in particular the steering rim of the steering device. The form fitting segments together can enclose at least 50%, at least 65%, at least 75%, at least 90%, at least 95% or at least 99% of the circumference of the radial cross-section of the steering wheel rim. This results in a uniform cohesive bonding.

By using heated form fitting segments, a thermally activatable bonding agent for example can be thermally activated so that a cohesive connection is formed between the at least one material segment and the steering device. By using heated form fitting segments, for example other bonding agents can also be spread more easily in order to achieve a better cohesive connection between the at least one material segment and the steering device.

Simultaneously with step ii) of this method, the at least one portion of the steering device can be heated by at least one heated form fitting segment. The at least one portion of the steering device can be heated in a temperature range of 21° C. to 200° C., in particular 75° C. to 125° C. or 50° C. to 95° C. Alternatively, subsequent to step ii), the at least one portion of the steering device can be heated by at least one heated form fitting segment in a temperature range of 21° C. to 200° C., in particular 75° C. to 125° C. or 50° C. to 95° C.

After step ii) of this method, the at least one portion of the steering device can be cooled by at least one cooled form fitting segment. By cooling the form fitting segments after the cohesive connection (gluing process), the bonding agent can e.g. be cured more quickly, which means a shortened process duration. Due to cooling, the form fitting segments can be removed from the steering device more quickly without again pulling the material segment off the steering device.

The at least one of the form fitting segments can be pressed against the at least one portion of the steering device with a pressure of 1 bar to 300 bar, in particular 1 bar to 50 bar or 1 bar to 6 bar.

The time for pressing the at least one form fitting segment against the at least one portion of the steering device can be e.g. 1 second to 60 minutes, in particular 10 seconds to 5 minutes.

In a first embodiment, the method for example comprises the following steps:
  a) contacting at least one portion of the steering device with at least one material segment; and subsequently
  b) applying a bonding agent onto the side of the at least one material segment facing the steering device (in particular the steering wheel rim of the steering device) and/or onto the side of the steering device facing the material segment; and subsequently
  c) optionally sewing the at least one material segment to itself; and subsequently
  d) incorporating the steering device into the bonding device; and subsequently
  e) joining at least two form fitting segments via a drive mechanism in such a way that the form fitting segments at least sectionally enclose the steering device (in particular the steering wheel rim of the steering device) and that the at least one material segment arranged between the steering device (in particular the steering wheel rim of the steering device) and the form fitting segments is urged against the steering device.

In a second embodiment, the method for example comprises the following steps:
  a) contacting at least one portion of the steering device with at least one material segment; and subsequently
  b) applying a bonding agent onto the side of the at least one material segment facing the steering device (in particular the steering wheel rim of the steering device) and/or onto the side of the steering device facing the material segment; and subsequently
  d) incorporating the steering device into the bonding device; and subsequently
  e) joining at least two form fitting segments via a drive mechanism in such a way that the form fitting segments at least sectionally enclose the steering device (in particular the steering wheel rim of the steering device) and that the at least one material segment arranged between the steering device (in particular the steering wheel rim of the steering device) and the form fitting segments is urged against the steering device. and subsequently
  c) optionally sewing the at least one material segment to itself.

In a third embodiment, the method for example comprises the following steps:
  b) applying a bonding agent onto the side of the at least one material segment facing the steering device (in particular the steering wheel rim of the steering device) and/or onto the side of the steering device facing the material segment; and subsequently
  a) contacting at least one portion of the steering device with at least one material segment; and subsequently
  d) incorporating the steering device into the bonding device; and subsequently
  e) joining at least two form fitting segments via a drive mechanism in such a way that the form fitting segments at least sectionally enclose the steering device (in particular the steering wheel rim of the steering device) and that the at least one material segment arranged between the steering device (in particular the steering wheel rim of the steering device) and the form fitting segments is urged against the steering device; and subsequently
  c) optionally sewing the at least one material segment to itself.

In a fourth embodiment, the method for example comprises the following steps:
  b) applying a bonding agent onto the side of the at least one material segment facing the steering device (in particular the steering wheel rim of the steering device) and/or onto the side of the steering device facing the material segment; and subsequently
  a) contacting at least one portion of the steering device with at least one material segment; and subsequently c) optionally sewing the at least one material segment to itself, and subsequently d) incorporating the steering device into the bonding device; and subsequently e) joining at least two form fitting segments via a drive mechanism in such a way that the form fitting segments at least sectionally enclose the steering device (in particular the steering wheel rim of the steering device) and that the at least one material segment arranged between the steering device (in particular the steering wheel rim of the steering device) and the form fitting segments is urged against the steering device.

For example, there is described the use of the device according to the solution or the use of the method according to the solution for bonding at least one leather segment or at least one functional element to a steering device, in particular to a steering wheel rim of a steering device.

BRIEF DESCRIPTION OF THE DRAWINGS

The solution will be explained in detail below using exemplary embodiments with reference to the Figures.

DETAILED DESCRIPTION

Figure 1A:
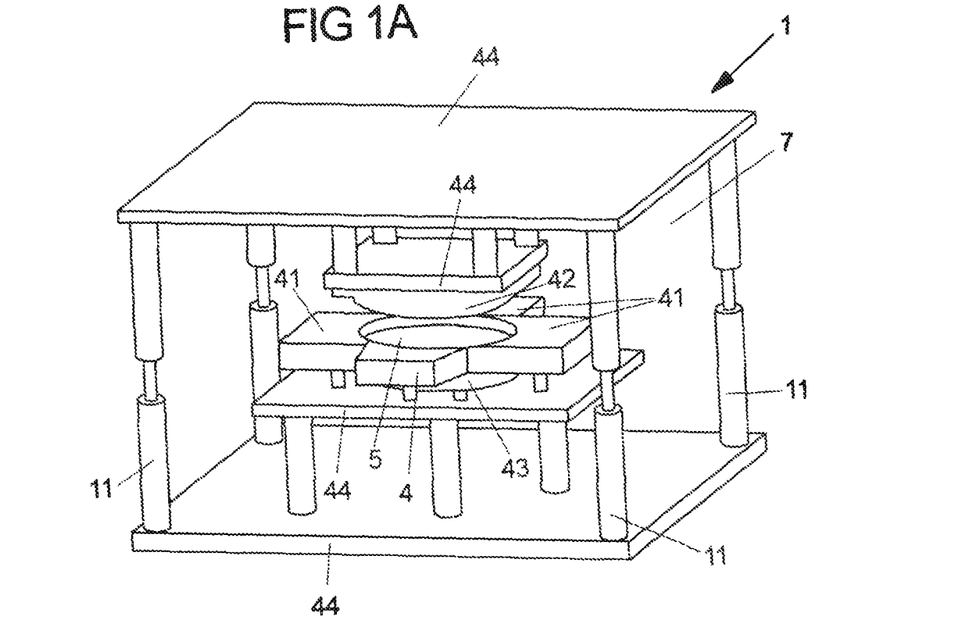
FIG. 1A shows a view of a component group of a bonding device according to an exemplary embodiment.
Figure 1B:
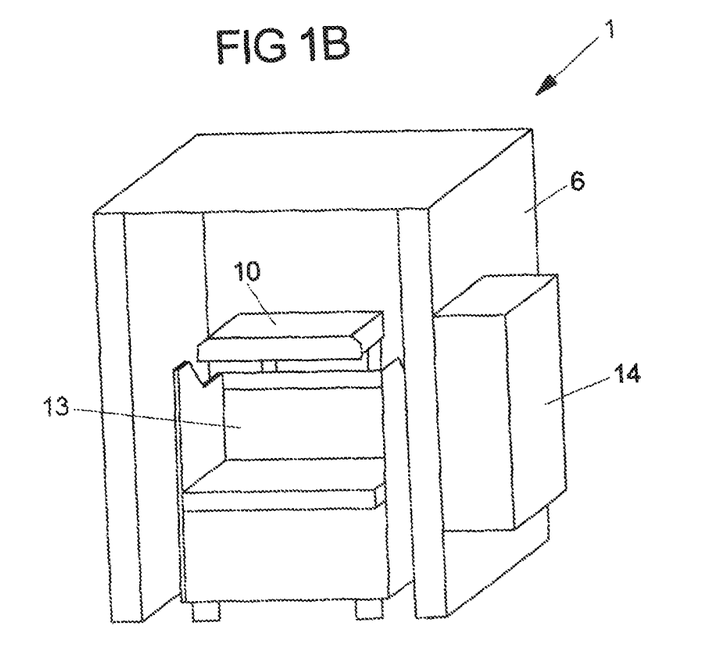
FIG. 1B shows a view of another component group of the bonding device comprising a pressure generating unit.

The component groups of FIG. 1A and FIG. 1B together form a device 1 for bonding (bonding device) at least one material segment, in particular leather or a functional mat, to a steering device (not shown), in particular to a steering wheel rim of the steering device. The bonding device 1 includes an interior space 7 and a receptacle 5 disposed therein for receiving the steering device. The receptacle can have a circular shape that corresponds to a form fitting die of the steering wheel to be inserted. The bonding device 1 comprises a plurality of form fitting segments 4 which are movably mounted relative to each other. The form fitting segments 4 are configured in such a way that they can at least sectionally enclose the steering device, in particular the steering wheel rim of the steering device. The plurality of form fitting segments 4 can comprise e.g. an upper form fitting segment 42, a lower form fitting segment 43 and a plurality of lateral form fitting segments 41. The upper form fitting segment 42 can be adapted to be incorporated, e.g. lowered or folded, into the free space 12 for the steering device 3. In addition, the bonding device 1 has a drive mechanism for moving the movably mounted form fitting segments 4 towards the steering device 3 (or the interior space 7 and/or the free space 12).

The form fitting segments can be arranged on a form fitting segment carrier 44. The component group of the bonding device in FIG. 1B includes a housing 6 and a pressure generating unit 10 in whose space 13 the component group of FIG. 1A can be incorporated. The pressure generating unit 10 can be actuated for example via a control unit 14 in order to move the form fitting segment carriers 44 in the direction of the steering device 3 or of the free space 12 or of the receptacle 5 for receiving the steering device 3. The cylinders 11 can be guide cylinders or pneumatic cylinders.

The form fitting segment carriers 44 can be pivoted or lowered and lifted, respectively, so that e.g. an upper form fitting segment 41 is moved towards the steering device 1. In case the form fitting segment carriers 44 are of pivotable design, the guide cylinders can be constructed of two guide parts, for example, which in operation can get in contact with each other or can engage into each other, for example to not fall below a specified distance between the form fitting segment carriers 44. For example, it would also be conceivable that the form fitting segment carriers 44 are interconnected with pneumatic or hydraulic cylinders that can be compressed by applying a pressure, whereby the upper form fitting segment 42 can be moved into the free space 12 for the steering device and urges against the steering device.

Figure 2:
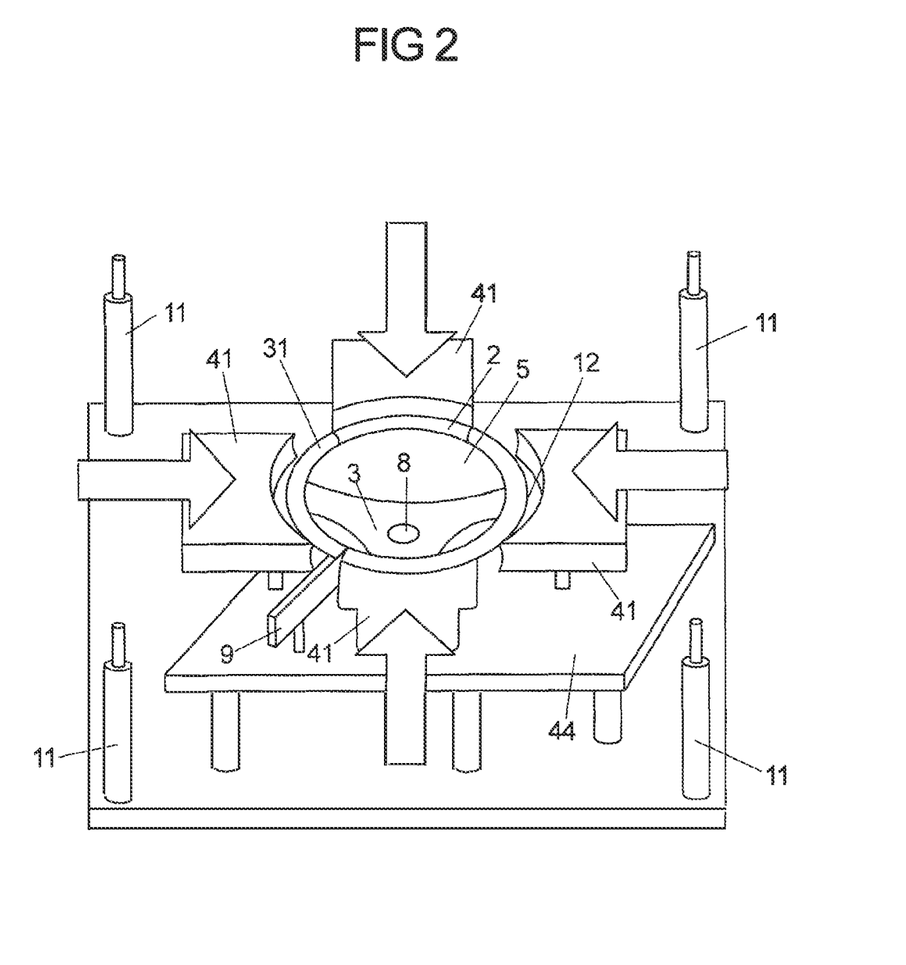
FIG. 2 shows a detail view of a section of the assembly of FIG. 1A.

FIG. 2 shows a view of another embodiment of the bonding device with (at least) one fixing element. The steering device can be incorporated into the free space 12 provided for the same within the receptacle 5 of the bonding device and be arranged on a holding device 8. The (at least one) fixing element 9 can fix the at least one material segment 2 on the steering wheel rim 31 of the steering device 3 by at least partly (in particular positively) enclosing the steering wheel rim 31 or by fixing the at least one material segment 2 on the steering wheel rim 31 or the spokes of the steering device at certain points. The bonding device 1 comprises four lateral form fitting segments 41 which are movably mounted relative to each other and can be moved towards the steering device 3 via a drive mechanism. The form fitting segments at least sectionally enclose the steering device 3 so that the at least one material segment 2 arranged between the steering device 3 and the form fitting segments 4 is urged against the steering device 3. The form fitting segments 4 and the (at least one) fixing element 9 can be joined to form a form fitting die for the steering device 3, wherein the form fitting segments 4 include cutouts for the (at least one) fixing element 9.

Figure 3:
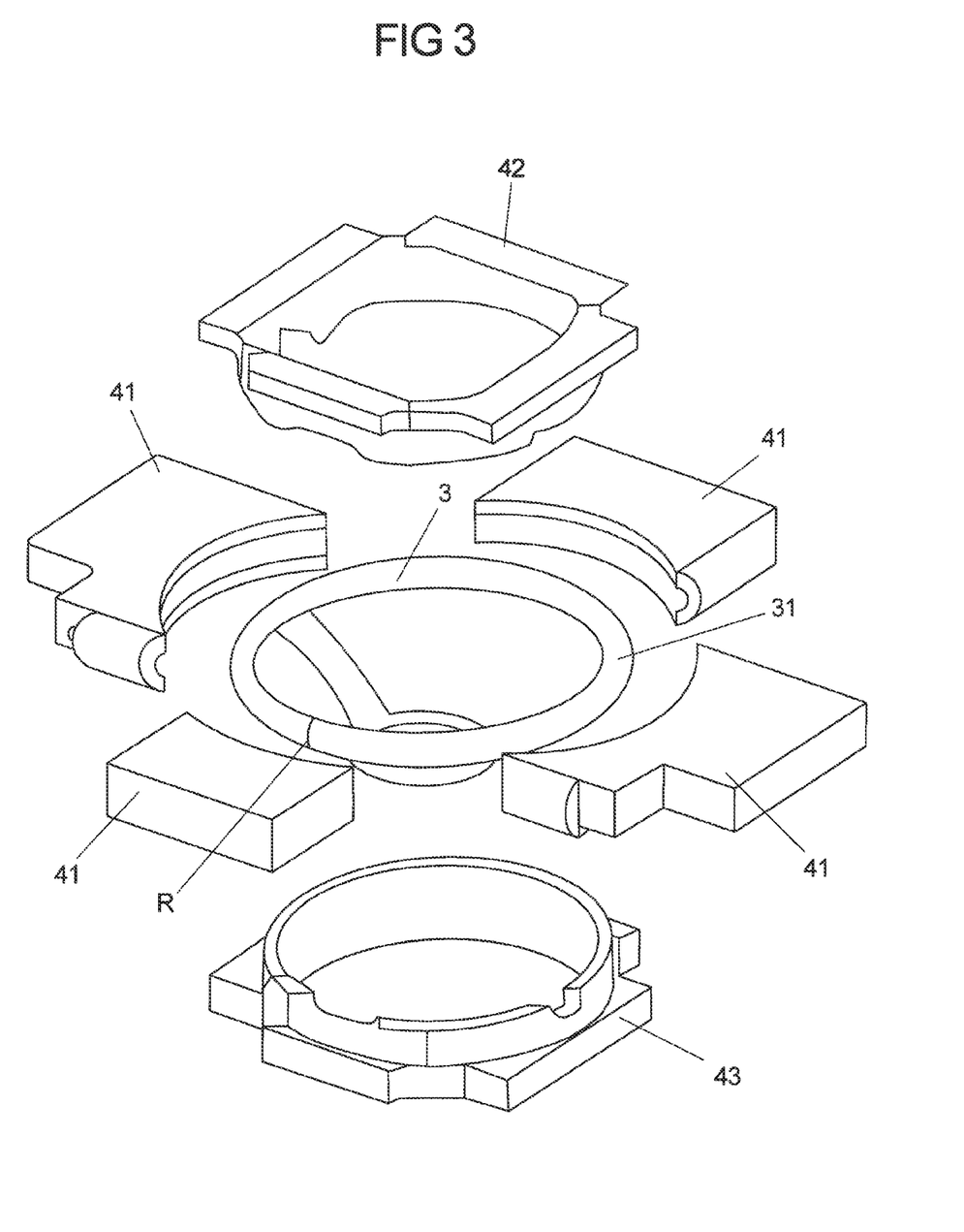
FIG. 3 shows an exploded drawing of the steering device comprising form fitting segments.

FIG. 3 shows an exploded drawing of the steering device 3 with a plurality of form fitting segments 4 that can be joined to form a form fitting die for the steering device 3. The form fitting segments 4 for example can positively and/or friction-locked enclose the at least one material segment 2 applied onto the steering wheel rim 31 of the steering device. The plurality of form fitting segments 4 in particular can comprise four lateral, curved form fitting segments 41 (adapted to the curvature of the steering wheel rim), an upper form fitting segment 42 and a lower form fitting segment 43. The form fitting segments 4 have a curvature on the side directed towards the steering device. The lateral form fitting segments 41 on the one hand are concavely curved towards the outer regions of the steering wheel rim in order to be able to enclose the outer regions of the steering wheel rim 31, and on the other hand are curved corresponding to the cross-section of the steering wheel rim extending around the steering wheel hub. The upper form fitting segment 42 and the lower form fitting segment 43, respectively, are convexly curved in order to be able to enclose the inner regions of the steering wheel rim 31.

Figure 4:
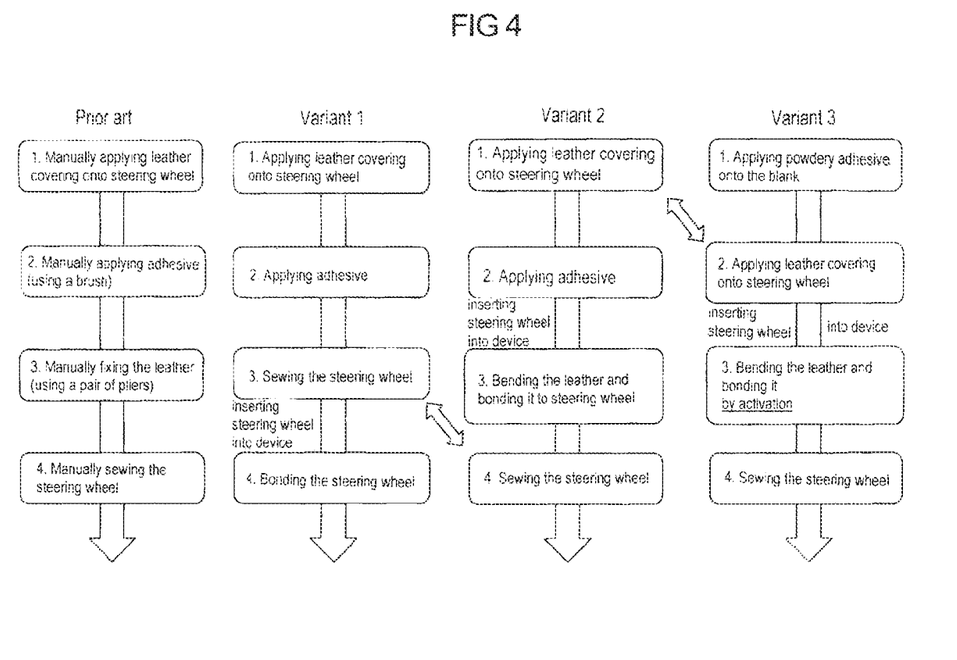
FIG. 4 shows a schematic representation of various methods for bonding at least one material segment to a steering device.

FIG. 4 shows a schematic representation of various embodiments of a method for bonding at least one material segment, in particular a leather segment, to a steering device, in particular the steering wheel rim of the steering device. The methods comprise the following steps:

a) contacting a leather segment with a steering wheel rim of a steering device;

b) applying a bonding agent onto the side of the leather segment that faces the steering wheel rim and/or onto the side of the steering wheel that faces the leather segment;

d) incorporating the steering device into the bonding device, c) sewing the leather segment to itself;

e) joining at least two form fitting segments via a drive mechanism in such a way that the form fitting segments at least sectionally enclose the steering wheel rim of the steering device and that the at least one leather segment arranged between the steering wheel rim of the steering device and the form fitting segments is urged against the steering device.

One embodiment contains the above-mentioned method steps in the following order a, b, c, d, e, whereas another embodiment contains the above-mentioned method steps in the following order a, b, d, e, c. Yet another embodiment contains the above-mentioned method steps in the following order b, a, d, e, c.

By comparison, there is shown a typical method of the prior art in which the leather covering is manually applied onto the steering wheel, the adhesive is manually applied onto the leather segment by using a brush, the leather is manually bent over and fixed on the steering device by using a pair of pliers and subsequently is manually sewn around the steering wheel.

LIST OF REFERENCE NUMERALS 1 device
2 material segment
3 steering device
31 steering wheel rim
4 form fitting segment
41 lateral form fitting segment
42 upper form fitting segment
43 lower form fitting segment
44 form fitting segment carrier
5 receptacle
6 housing
7 interior space
8 holding device
9 fixing element
10 pressure generating unit
11 cylinder
12 free space
13 space
14 control unit
R radial cross-section

The invention claimed is:

1. A device for bonding at least one material segment to a steering device comprising at least two form fitting segments, wherein at least one of the form fitting segments is a movably mounted form fitting segment movably mounted relative to at least one other form fitting segment of the form fitting segments, wherein the form fitting segments are configured in such a way that they can at least sectionally enclose the steering device, comprising the steering wheel rim of the steering device;

a receptacle for receiving the steering device;

a drive mechanism for moving the at least one movably mounted form fitting segment towards the steering device;

wherein the at least two form fitting segments are laterally movable towards the steering device or away from the same; and at least one fixing element which is configured to fix the at least one material segment at certain points on the steering device before joining the form fitting segments.

2. The device according to claim 1, wherein the at least two form fitting segments can be joined to form a form fitting for the steering device.

3. The device according to claim 1, wherein the form fitting segments are at least partly curved.

4. The device according to claim 1, wherein at least one of the form fitting segments are configured in such a way that they can jointly enclose at least 50% of the circumference of the radial cross-section of the steering wheel rim, the form fitting segments can be exchanged, and the form fitting segments are made of a silicone-coated steel or a silicone-coated aluminum.

5. The device according to claim 1, wherein the device includes a housing that surrounds an interior space.

6. The device according to claim 1, wherein the receptacle is disposed in the interior space of the housing and includes a free space for receiving a steering device.

7. The device according to claim 1, wherein the receptacle includes a holding device for receiving a steering device.

8. The device according to claim 1, wherein the device includes at least one pressure generating unit for applying pressure to at least one of the form fitting segments.

9. The device according to claim 1, wherein the device includes at least one heatable form fitting segment and at least one heating unit that communicates with the at least one heatable form fitting segment.

10. The device according to claim 1, wherein the drive mechanism comprises at least one motorized, hydraulic and/or pneumatic drive.

11. The device according to claim 1, wherein the drive mechanism includes at least one pneumatic cylinder that is operatively connected to at least one form fitting segment.

* * * * *